United States Patent [19]

Tokuyama

[11] Patent Number: 4,490,755
[45] Date of Patent: Dec. 25, 1984

[54] RECORDING AND REPRODUCING VIDEO SIGNALS AT SELECTABLE DIFFERENT TAPE TRAVELING SPEEDS FROM PLURAL VIDEO HEAD PAIRS

[75] Inventor: Yoshio Tokuyama, Yokohama, Japan

[73] Assignee: Victor Company of Japan, Ltd., Kanagawa, Japan

[21] Appl. No.: 395,219

[22] Filed: Jul. 6, 1982

[30] Foreign Application Priority Data

Jul. 9, 1981 [JP] Japan .................. 56-107372
Jul. 10, 1981 [JP] Japan .................. 56-102475[U]

[51] Int. Cl.³ .................. G11B 5/008; G11B 15/46
[52] U.S. Cl. .................. 360/70; 360/73
[58] Field of Search .................. 358/310, 321; 360/70, 360/73

[56] References Cited

U.S. PATENT DOCUMENTS 4,293,880 10/1981 Tsukada et al. .................. 360/10

FOREIGN PATENT DOCUMENTS 2647430 4/1977 Fed. Rep. of Germany .
2356268 9/1977 Fed. Rep. of Germany .
2838848 7/1979 Fed. Rep. of Germany .

OTHER PUBLICATIONS

Nobuo Azuma et al., -Microprocessor Controlled Variable Play-Back Speed System for Video Tape Recorder—IEEE Transactions on Consumer Electronics, vol. CE-26, Feb. 1980, pp. 121-128.

Primary Examiner—George G. Stellar
Attorney, Agent, or Firm—Ladas & Parry

[57] ABSTRACT

A video signal recording and reproducing apparatus records and reproduces a video signal on and from a magnetic tape, by selecting an arbitrary recording and reproducing mode from among a plurality of recording and reproducing modes in which tape traveling speed and track pitch differ, and by selecting a plurality of pairs of video heads. The recording and reproducing apparatus comprises a recording and reproducing circuit having a plurality of pairs of video heads, for recording a frequency-modulated video signal on tracks formed obliquely with respect to the longitudinal direction of the magnetic tape and reproducing the recorded frequency-modulated video signal from the tracks by a selected pair of video heads, a capstan for driving the magnetic tape in travel at a speed in accordance with the selected recording and reproducing mode, a head servo circuit supplied with a vertical synchronizing signal within the video signal or a signal in phase synchronism with the vertical synchronizing signal as a reference signal upon recording, and supplied with a reference signal from a reference signal generating circuit upon reproduction, for rotating the plurality of pairs of video heads at a constant speed, a first delay circuit for delaying a signal used as the reference signal for the head servo circuit, a control head for recording an output signal of the first delay circuit as a control pulse onto a control track on the magnetic tape, a second delay circuit for delaying an input signal or an output signal of the first delay circuit, and a capstan servo circuit supplied with a signal obtained by detecting the rotation of the capstan and an output signal of the second delay circuit upon recording, and supplied with a reproduced control pulse from the control head and the output signal of the second delay circuit upon reproduction, for comparing phases of the signals supplied thereto, to rotate the capstan at a speed in accordance with the selected recording and reproducing mode by a compared output.

7 Claims, 9 Drawing Figures

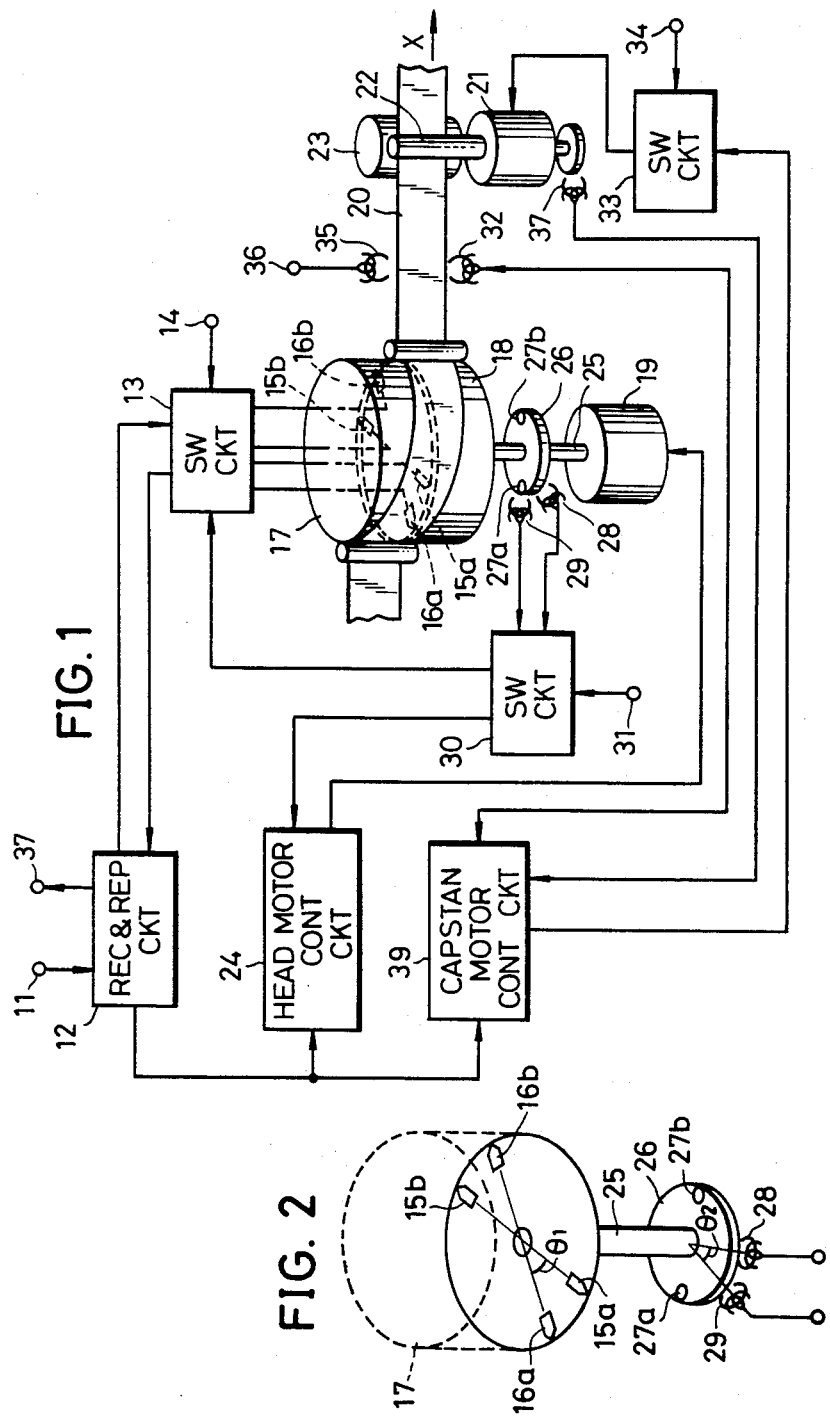

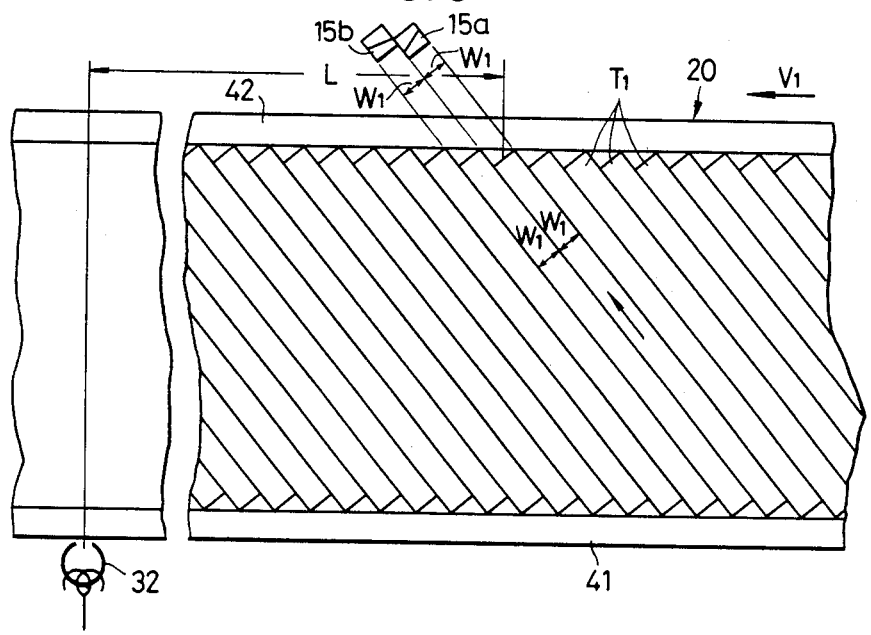
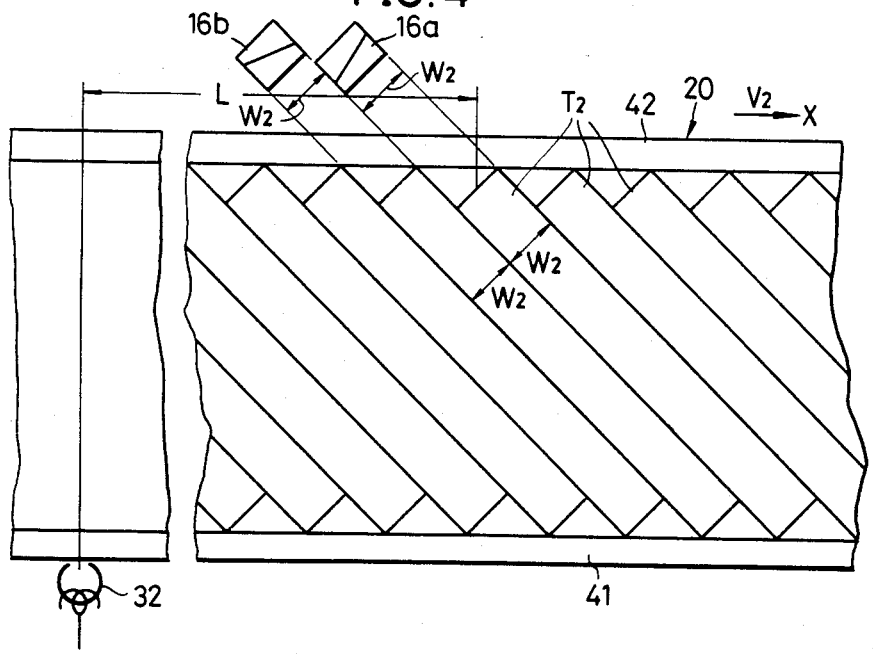

RECORDING AND REPRODUCING VIDEO SIGNALS AT SELECTABLE DIFFERENT TAPE TRAVELING SPEEDS FROM PLURAL VIDEO HEAD PAIRS

BACKGROUND OF THE INVENTION

The present invention generally relates to recording and reproducing apparatuses for recording and reproducing video signals on and from a magnetic tape whose traveling speed can be selectably changed. More particularly, the present invention relates to a video signal recording and reproducing apparatus having a circuit construction capable of easily performing preset correction of tracking at few adjusting positions, in an apparatus for recording and reproducing video signals on and from a magnetic tape of a given length which is traveling at a tape speed in accordance with a mode selected from between a long-time (long-duration) recording and reproducing mode and a short-time (short-duration), that is, regular recording and reproducing mode.

Generally, in video signal recording and reproducing apparatuses, an audio signal accompanying the video signal is recorded and reproduced by a stationary head. Hence, as the traveling speed of the magnetic tape is increased, the recording and reproducing characteristics and the signal-to-noise (S/N) ratio of the audio signal are improved. In addition, undesirable effects such as noise due to wow and flutter of the magnetic tape becomes relatively small. On the other hand, as the traveling speed of the magnetic tape is increased, the recording and reproducing time for a given length of magnetic tape becomes shorter.

Accordingly, a video signal recording and reproducing apparatus which can be selectively operated, according to the purpose of use, in a short-time recording and reproducing mode having a high magnetic tape traveling speed and a long-time recording and reproducing mode having a low magnetic tape traveling speed, has been reduced to practice in a concrete form. Since recording and reproduction are carried out with the tape driven at a high speed in the short-time recording and reproducing mode, the recording and reproducing time is short for the same tape length, but the audio signal is recorded and reproduced with good characteristics. In the long-time recording and reproducing mode, although the characteristics of the audio signal are somewhat inferior to those in the case of the short-time or regular recording and reproducing mode, recording and reproduction of the video signal and the audio signal for an even longer period can be carried out.

In a video signal recording and reproducing apparatus of this heretofore known kind, however, the track width of the magnetic head, the traveling speed of the magnetic tape, and the like are set so that the tracks are formed without gaps therebetween in the long-time recording and reproducing mode. For this reason, in the short-time recording and reproducing mode, gaps are formed between adjacent tracks, whereby guard bands are substantially formed, as described more fully hereinafter in conjunction with a drawing. As a disadvantageous consequence, the tape utilization efficiency during this short-time recording and reproducing mode has been poor.

Accordingly, a video signal recording and reproducing apparatus in which the above described disadvantages have been eliminated, was proposed in a U.S. Pat. No. 4,293,880 in which the assignee is the same as that of the present application, and reduced to practice. This proposed video signal recording and reproducing apparatus is provided with a first pair of magnetic heads having a certain track width for long-time recording and reproduction, and a second pair of magnetic heads having a track width greater than the above certain track width for short-time or regular recording and reproduction. These pairs of magnetic heads are selectively used by switching according to the recording and reproducing mode. According to this proposed apparatus, the tracks are formed without gaps, and the tape utilization efficiency is high, not only during the long-time recording and reproducing mode (hereinafter simply referred to as long-time mode), but also during the regular recording and reproducing mode (hereinafter simply referred to as regular mode). Particularly during the regular mode, portions heretofore left as gaps on the magnetic tape are also used for the recording and reproduction. This enables recording and reproduction with high S/N ratio, and further, reduces the generation of dropout.

The apparatus reduced to practice, can be switched between a 2-hour regular mode and a 6-hour long-time mode, with respect to a standard type cassette tape. Speaking in more concrete terms, the apparatus has a rotary body provided with a first pair of video heads for 2-hour recording and reproduction, and a second pair of video heads for 6-hour recording and reproduction. During the 6-hour recording and reproducing mode, the tape is caused to travel at a speed which is ⅓ the tape traveling speed upon the 2-hour recording and reproducing mode. In addition, the track width of the second pair of video heads is selected to ⅓ the track width of the first pair of video heads.

Generally, in this kind of so-called helical scan type recording and reproducing apparatus which records and reproduces the video signal on and from tracks formed obliquely with respect to the longitudinal direction of the magnetic tape by rotary video heads, it must be possible to finely reproduce a magnetic tape recorded by one recording and reproducing apparatus by another recording and reproducing apparatus. That is, the video heads of the latter apparatus must positively and accurately scan over the tracks on the magnetic tape recorded by the former apparatus. Accordingly, a distance L along the tape traveling path between a position where the scanning of the track on the tape by the video head is terminated, and a position where a control head for recording and reproducing a control signal on and from an end edge of the tape makes contact with the tape, is determined according to a standard. Thus, in order to set the distance between the above two positions to the predetermined distance L, the following adjustment was conventionally performed. That is, the control head is mechanically mounted at a position where the above distance becomes substantially equal to the predetermined distance L. Next, a frequency-modulated signal is recorded onto the magnetic tape by the rotary heads while a control pulse is recorded onto the tape by the control head. Then, these signals thus recorded onto the tape are reproduced by the same recording and reproducing apparatus, and the time constant of a monostable multivibrator in a reference signal generating circuit part within a capstan servo circuit, for example, is adjusted so that the level of the reproduced frequency-modulated signal becomes maximum. Thereafter, a standard tape pre-recorded in an ideal state by a magnetic recording and reproducing apparatus having the predetermined distance L is reproduced, and the position of the above control head is adjusted so that the level of the frequency-modulated signal reproduced from the standard tape becomes maximum.

However, even in the above recording and reproducing apparatus which selectively operates in the regular mode and the long-time mode with the video heads exclusively for each mode, only one control head is provided. Thus, the condition with respect to the above distance L must be satisfied in both the regular and long-time modes. But irregularities to some extent inevitably exist in the tape driving system in the regular and long-time modes, positional adjustment of the control head, and relative height positions of the first pair of video heads and the second pair of video heads. Therefore, if the distance L is adjusted by mechanically positioning the control head during the regular mode, the value of the distance L becomes different during the long-time mode. This introduces problems in the tape interchangeability.

Moreover, in the above recording and reproducing apparatus, the adjustment of the distance L with respect to the regular mode (or the long-time mode) can be performed by mechanically adjusting the position of the control head, but the position of the control head cannot be adjusted mechanically in the long-time mode (or the regular mode). Thus, measures were taken by electrically compensating for the deviation of the actual distance L from the predetermined distance L in the long-time mode (or the regular mode), so that the actual distance L and the predetermined distance L become equivalent on the magnetic tape.

However, the tracking adjusting operation to accurately obtain the above predetermined distance L and achieve normal tracking, is exceedingly complex and troublesome. In the conventional apparatus, for example, it was necessary to perform four adjusting steps.

SUMMARY OF THE INVENTION

Accordingly, it is a general object of the present invention to provide a novel and useful video signal recording and reproducing apparatus in which the above described problems have been eliminated.

Another and more specific object of the present invention is to provide a video signal recording and reproducing apparatus capable of easily performing a preset adjustment of the tracking of the heads by mechanically and electrically adjusting the position of a control head, at few adjusting positions requiring few adjusting operations, in an apparatus for recording and reproducing a video signal on and from a magnetic tape in a regular mode and a long-time mode, by selectively using a plurality of pairs of video heads.

Still another object of the present invention is to provide a video signal recording and reproducing apparatus in which a vertical synchronizing signal within a video signal to be recorded or a signal in phase synchronism with the vertical synchronizing signal is passed through a pulse delay circuit and recorded onto a magnetic tape as a control pulse by a control head, a reference signal generated by a reference signal generating circuit is supplied to a head servo system simultaneously as the supplying of the reference signal to a capstan servo system through the pulse delay circuit upon reproduction, and phases of the reference signal obtained through the pulse delay circuit and a control pulse reproduced by the control head are respectively compared within the capstan servo system. According to the apparatus of the present invention, the tracking preset correction in one mode other than the mode wherein the position of the control head can be adjusted mechanically, can be performed by simply reproducing a standard tape for the above one mode and variably controlling the delay quantity of the pulse delay circuit so that the level of a frequency-modulated signal reproduced from the standard tape becomes maximum. Hence, the tracking preset correction operation can be simplified compared to the conventional apparatus. In addition, in the apparatus according to the present invention, the circuit construction is simplified and the cost is low compared to the conventional circuit, because the above pulse delay circuit is commonly used during the recording and reproduction. Moreover, because the pulse delay circuit is provided in a reference signal circuit system within the reproducing system, it becomes possible to prevent the capstan servo system from becoming unstable. The apparatus according to the present invention is particularly suited for application in a magnetic recording and reproducing apparatus for home use.

Other objects and further features of the present invention will be apparent from the following detailed description when read in conjunction with the accompanying drawings.

BRIEF DESCRIPTION OF THE DRAWINGS

FIG. 1 is a general system block diagram showing an example of a video signal recording and reproducing apparatus to which the present invention may be applied;

FIG. 2 is a general perspective view showing rotary heads and pickup heads in the block system shown in FIG. 1;

FIG. 3 shows a track pattern on a magnetic tape formed by an apparatus according to the present invention during a long-time mode;

FIG. 4 shows a track pattern on a magnetic tape formed by an apparatus according to the present invention during a regular mode;

DETAILED DESCRIPTION

Figure 5:
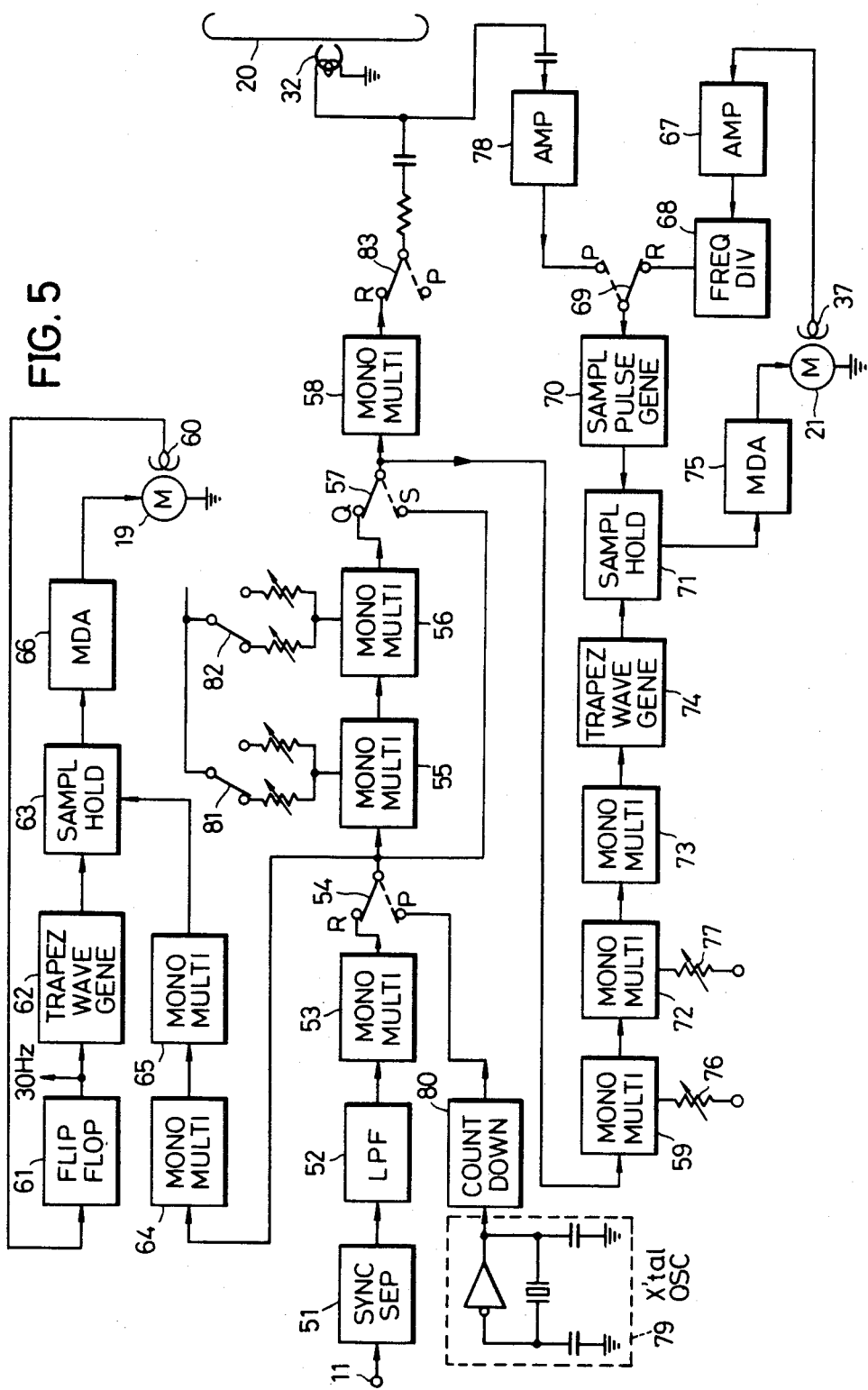
FIG. 5 is a system block diagram showing an embodiment of an essential part of the video signal recording and reproducing apparatus according to the present invention.

First, description will be given on the principle of a video signal recording and reproducing apparatus using a plurality of pairs of video heads and operable in a regular mode and a long-time mode when switched, to which the concept of the present invention can be applied, by referring to FIG. 1. This apparatus shown in FIG. 1 is identical to that disclosed in the U.S. Pat. No. 4,293,880.

In FIG. 1, a video signal which is to be recorded, is introduced into the apparatus through an input terminal 11. The signal from the terminal is supplied to a switching circuit 13 through a recording and reproducing circuit 12. The switching circuit 13 is switched over in accordance with a mode setting signal applied through a terminal 14, in such a manner that the signal from the recording and reproducing circuit 12 is fed to a pair of video heads 15a and 15b during the long-time mode and to another pair of video heads 16a and 16b during the regular mode.

The video heads 15a and 15b have oppositely oriented azimuths, and are mounted on diametrically opposite sides of a rotary drum 17, which is rotated at a rotational speed of 30 rps by a head motor 19. The video heads 16a and 16b similarly have oppositely oriented azimuths and are mounted on diametrically opposite sides of the rotary drum 17, and are separated by a specific angle $f1$ with respect to the video heads 15a and 15b (70°, for example) as shown in FIG. 2. In the present embodiment, the video heads 16a and 16b have a track width which is substantially three times the track width of the video heads 15a and 15b, as will be described hereinafter.

A magnetic tape 20 is wrapped obliquely around the rotary drum 17 and a stationary drum 18. The tape 20 is driven in the arrow direction X by means of a capstan 22 which is driven by motor 21 and a pinch roller 23. The video signal is recorded by the video heads 15a and 15b, or 16a and 16b, which alternately and successively scan along tracks on the tape 20, for one field for each track. The tracks are positioned contiguously to each other and obliquely relative to the longitudinal direction of the tape.

On the other hand, a vertical synchronizing signal separated from the video signal in the recording and reproducing circuit 12, is supplied to a head motor control circuit 24 and a capstan motor control circuit 39.

The rotary drum 17 is coaxially mounted on a vertical rotating shaft 25, which is driven by the motor 19 and rotates together with the rotary drum 17. A pair of magnets 27a and 27b of opposite polarity are mounted on a rotating disc 26 which is fixed coaxially to the rotating shaft 25. As the rotary drum 17 rotates, pulses of positive polarity and negative polarity are alternately picked up by pickup heads 28 and 29, and supplied to a switching circuit 30. The pickup heads 28 and 29 are disposed to oppose the rotating disc 26, and are separated from each other by an interval of angle $\theta2$ (where, $\theta2=\theta1$). In a case where $\theta2\neq\theta1$, the picked-up signal may be corrected to obtain the same result as in the case where $\theta2=\theta1$.

The switching circuit 30 is switched over in accordance with a mode setting signal applied through a terminal 31 in a manner such that the signal from the head 28 is supplied to the head motor control circuit 24 when the long-time mode is in use and the signal from the head 29 is supplied to the control circuit 24 when the regular mode is in use.

The head motor control circuit 24 is supplied with a drum pulse formed from a picked-up signal in the switching circuit 30, and further, with the vertical synchronizing signal from the recording and reproducing circuit 12. The control circuit 24 thus forms a control signal, which is then applied to the head motor 19. Accordingly, the rotational phase of the head motor 19 is controlled so that the video heads 15a and 15b, or 16a and 16b, form tracks and record the vertical synchronizing signal at the longitudinal edge of each track.

The capstan motor control circuit 39, when the recording mode is in use, forms a control signal, which is thereafter supplied to a control head 32. By this control head 32, the control signal is recorded at one lateral edge of the tape 20 along a track in the longitudinal direction of the tape 20. At the time of reproduction, the control signal is reproduced by the control head 32 and is formed into a specific capstan control signal by the capstan motor control circuit 39 and is thereafter supplied to a switching circuit 33. The swithcing circuit 33 is switched over in accordance with a mode setting signal applied from a terminal 34 so that the control signal from the capstan motor control circuit 39 is supplied to the motor 21. Accordingly, in the present embodiment, the capstan 22 is rotated, in the regular mode, at a speed which is three times that for the rotational speed upon long-time mode, whereby the tape 20 is driven at triple speed.

An audio signal is introduced through a terminal 36 to an audio head 35, by which the signal is recorded on an audio track at the opposite lateral edge of the tape 20 and is reproduced from the track.

When long-time recording is first to be carried out on a tape of a specific length, the apparatus is set to the long-time mode. In this mode, the long-time mode signal is applied to the terminals 14, 31, and 34. Accordingly, the respective switching circuits 13, 30, and 33 are switched thereby to cause the video heads 15a and 15b, the pickup head 28, and the capstan motor 21 to assume their operational states.

As a consequence, the tape 20 is driven at a relatively low normal speed V1, and the video signal is recorded by the video heads 15a and 15b on tracks T1 which are formed contiguously to each other with no space left therebetween and obliquely relative to the longitudinal direction of the tape 20, as indicated in FIG. 3. Tha gaps of the video heads 15a and 15b have oppositely oriented azimuths and have the same track width W1. Accordingly, the tracks T1 formed have subtantially the width W1.

The pulse picked up by the pickup head 28, is supplied to the head motor control circuit 24, where it is formed into a drum pulse. The rotation of the motor 19 is resultingly controlled in such a manner that the video heads 15a and 15b will record the vertical synchronizing signal of the video signal near the longitudinal end of the tracks T1.

The control signal is recorded on a control track 41 by the control head 32. The audio signal is recorded on an audio track 42 by the audio head 35.

When the tracks T1 which have been recorded in the long-time mode as described above are to be reproduced, the tape 20 is driven at the speed V1, the same as for the long-time recording mode. The video signals reproduced by the video heads 15a and 15b, one field per head, are supplied to the switching circuit 13, where they are subjected to switching based on the drum pulse from the switching circuit 30, and are thus combined into a continuous video signal. The resulting output signal is demodulated in the recording and reproducing circuit 12 and is led out through an output terminal 37 as a reproduced signal.

When a long recording time is not required, or alternately, when recording and reproducing audio signals having a good frequency characteristic is desired, it is necessary to increase the tape traveling speed. For the puspose of increasing the tape traveling speed, the apparatus is set to the regular mode. In this mode, the regular mode signal is applied to the terminals 14, 31, and 34, and the respective switching circuits 13, 30, and 33 are then switched over thus causing the video heads 16a and 16b, the pickup head 29, and the capstan motor 21 to assume their operational states. As a consequence, the tape 20 travels at a speed V2 which is three times the above described speed V1.

That is, in the regular mode, the video signal is recorded by the video heads 16a and 16b to form the tracks T2 positioned obliquely relative to the longitudinal direction of the tape 20 and contiguously to each other without gaps therebetween, as indicated in FIG. 4. The video heads 16a and 16b have gaps with oppositely oriented azimuths and have a track width W2 wider than the width W1. Accordingly, the tracks T2 having a width that is substantially W2 are formed. In the present embodiment, the width W2 is substantially three times the width W1.

Pulses picked up by the pickup head 29, are formed into drum pulses in the switching circuit 30. The rotation of the head motor 19 is controlled by the control signal from the head motor control circuit 24 in a manner such that the video heads 16a and 16b record the vertical synchronizing signal of the video signal near the longitudinal end of the tracks T2.

The control signal and the audio signal are respectively recorded by the heads 32 and 35 on the control track 41 and the audio track 42.

When the tracks T2 which have been recorded in the regular mode as described above are to be reproduced, the tape 20 is driven at the speed V2, which is the same as for the regular recording mode. The video signals reproduced by the video heads 16a and 16b are supplied to the switching circuit 13. There, the video signal are subjected to switching based on the drum pulse from the switching circuit 30, and are thus combined into a continuous video signal. The head 35 reproduces the audio signal.

Next, description will be given with respect to an actual block system of an essential part of the apparatus according to the present invention, by referring to FIG. 5. In FIG. 5, those parts which are the same as those corresponding parts in FIG. 1, are designated by the same reference numerals. However, FIG. 1 shows the block system of an apparatus operable in the regular mode and the long-time mode by the selective use of a plurality of pairs of heads, to merely show the principle of the apparatus. In FIG. 5, a part of the block system shown in FIG. 1 has been modified.

In FIG. 5, switches 54, 69, and 83 are respectively connected to the side of a contact R upon recording, and respectively connected to the side of a contact P upon reproduction. In addition, a switch 57 is connected to the side of a contact Q during the long-time mode and connected to the side of a contact S during the regular mode. Upon recording, the video signal to be recorded is supplied to a synchronizing signal separating circuit 51, through the input terminal 11. A synchronizing signal separated at the separating circuit 51 is applied to a monostable multivibrator 53, through a lowpass filter 52. Hence, a pulse in phase synchronism with the vertical synchronizing signal and having a 2-field period, is obtained from the monostable multivibrator 53. This pulse is successively supplied to monostable multivibrators 55 and 56, through the switch 54 which is connected to the side of the contact R upon recording. An output of the monostable multivibrator 56 is supplied to monostable multivibrators 58 and 59, respectively, through the switch 57 which is connected to the side of the contact Q. As described above, this switch 57 is connected to the side of the contact S during the regular mode, and to the contact Q during the long-time mode. The signal supplied to the monostable multivibrator 58 is converted into a pulse having a predetermined pulse width and a 2-field period. This converted pulse from the monostable multivibrator 58 is supplied to the control head 32, through the switch 83 which is connected to the side of the contact R. Thus, the signal supplied through the switch 83 is recorded on the track 41 on the magnetic tape 20, by the control head 32.

On the other hand, the heads 15a and 15b (or 16a and 16b) are rotated by the head motor 19, to record the frequency-modulated video signal. The rotation of the head motor 19 is picked up and detected by a drum pickup head 60 corresponding to the above drum pickup heads 28 and 29, and a resulting detection signal is applied to a flip-flop 61. A square wave having a 2-field period (frequency of 30 Hz) is obtained from the flip-flop 61, and supplied to a sample-and-hold (S/H) circuit 63 after being converted into a trapezoidal wave at a trapezoidal wave generator 62. The S/H circuit 63 is supplied with a sampling pulse delayed by a predetermined delay time than the vertical synchronizing signal and having a 2-field period, which is obtained through the monostable multivibrator 53, the switch 54, and monostable multivibrators 64 and 65. Thus, the S/H circuit 63 samples and holds the sloping part of the above trapezoidal wave. An output voltage of the S/H circuit 63 is applied to the head motor 19 through a motor driving amplifier 66, to control the rotation of the head motor 19 constant.

The rotation of the capstan motor 21 which rotates the capstan 22 at a constant speed, is detected by the capstan pickup head 37. A signal having a frequency in accordance with the rotation of the capstan motor 21, is supplied to a S/H circuit 71, through an amplifier 67, a frequency divider 68, the switch 69 connected to the side of the contact R, and a sampling pulse generating circuit 70.

The output of the monostable multivibrator 56 is supplied to the monostable multivibrator 59 through the switch 57 as described above, and adjusted of the width (duration). On the other hand, the output of the monostable multivibrator 59 is supplied to a monostable multivibrator 72 wherein positional adjustment is made. An output of the monostable multivibrator 72 is supplied to a monostable multivibrator 73 wherein the phase is inverted, and then converted into a trapezoidal wave at a trapezoidal wave generator 74. This trapezoidal wave is supplied to the S/H circuit 71 wherein the sloping part of the trapezoidal wave is sampled and held. An output of the S/H circuit 71 is applied to the capstan motor 21 through a motor driving amplifier 75, to control the rotation of the capstan motor 21 constant.

Next, description will be given with respect to the steps in electrically adjusting the position of the control head.

In a first adjusting step, the recording and reproduction is performed in the regular mode, and a variable resistor 76 is adjusted and the time constant of the monostable multivibrator 59 is variable set so that the level of the reproduced frequency-modulated video signal becomes maximum. That is, the frequency-modulated video signal is recorded onto the magnetic tape 20 by the video heads 16a and 16b in the regular mode as described above, and a pulse in synchronism with the vertical synchronizing signal separated and obtained from the video signal to be recorded, and having a 2-field period, is produced. This pulse thus produced, is supplied to the S/H circuit 71, through the switches 54 and 57, the monostable multivibrators 59, 72, 73, and the trapezoidal wave generating circuit 74. The pulse supplied to the S/H circuit 71 is sampled and held by the sampling pulse from the sampling pulse generating circuit 70. This sampling pulse is synchronized with the rotation of the capstan motor 21 and has a 2-field period. Accordingly, the capstan motor 21 is rotated at a constant speed by applying the output voltage of the S/H circuit 71 to the capstan motor 21 through the motor driving amplifier.

At the same time, the pulse in synchronism with the above vertical synchronizing signal from the monostable multivibrator 56 and having a 2-field period, is applied to the monostable multivibrator 58. The pulse thus supplied to the monostable multivibrator 58, is converted into a pulse having a predetermined pulse width and a repetition freqency of 30 Hz, and recorded by the control head 32 as the control pulse. At this point, the control head 32 is fixed at a position with a distance L substantially equal to the distance L upon normal mode, similarly as in the conventional case.

Thereafter, regular mode reproduction is performed with respect to the above recorded magnetic tape, by the same magnetic recording and reproducing apparatus. As described above, the switches 54, 69, and 83 are respectively connected to the side of the contact P during the reproduction mode. The control pulse reproduced by the control head 32 is supplied to the S/H circuit 71, through an amplifier 78, the switch 69, and the sampling pulse generating circuit 70. On the other hand, an output oscillation signal of a crystal oscillator 79 is counted down at a count down circuit 80, and then supplied to the monostable multivibrator 59 through the switch 54 connected to the contact P and the switch 57 connected to the contact S. The output of the monostable multivibrator 59 passes through the monostable multivibrators 72 and 73. The output of the monostable multivibrator 73 is converted into a trapezoidal wave at the trapezoidal wave generating circuit 74, and then supplied to the S/H circuit 71 wherein the trapezoidal wave is sampled and held.

The output voltage of the S/H circuit 71 is applied to the capstan motor 21 through the motor driving amplifier 75, to control the rotation of the capstan motor 21. Here, in order to perform the tracking preset, adjustments must be made so that the phase relationship between the output drum pulse of the flip-flop 61 and the reproduced control pulse becomes identical to that upon recording. The level of the reproduced frequency-modulated video signal becomes maximum at this point. Accordingly, the variable resistor 76 is adjusted and the time constant of the monostable multivibrator 59 is varied, so that the level of the reproduced frequency-modulated signal becomes maximum. By carrying out these adjustments, the tracking preset correction is performed.

The above tracking preset adjustment in the regular mode, is performed in a state where the control head 32 is in the vicinity of the predetermined position. Thus, it becomes necessary to mechanically adjust the position of the control head 32 so that the predetermined distance L is obtained. Therefore, as a second adjusting step, the standard tape of the regular mode is reproduced in the regular mode as described above, and the position of the control head 32 is mechanically adjusted so that the level of the reproduced frequency-modulated video signal becomes maximum. By performing the above first and second adjusting steps, the control head 32 becomes fixed at a position satisfying the predetermined distance L. Hence, the tracking preset correction is completed. The above described adjusting steps may be performed by circuits similar to the conventional circuits, by similar manipulation.

Next, the tracking preset correction for the long-time mode, is performed while reproducing a standard tape of a long-time mode. The standard tape of the long-time mode is a tape pre-recorded in an ideal state by an apparatus with the predetermined distance L. This standard tape of the long-time mode is recorded with a frequency-modulated video signal on video tracks, and a control pulse recorded on a control track.

Figure 6:
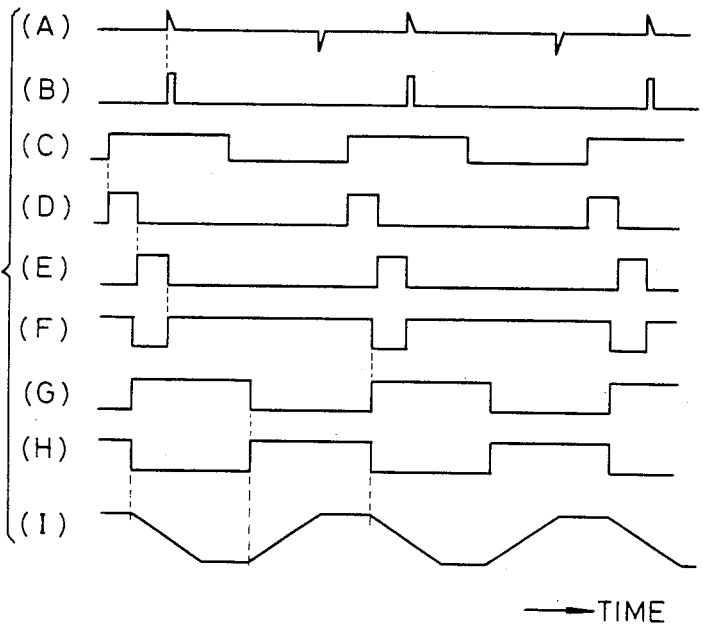
FIGS. 6(A) through 6(I) are graphs respectively showing signal waveforms at each part of the block system shown in FIG. 5.

The above standard tape recorded in the long-time mode, is reproduced by the magnetic recording and reproducing apparatus in which the tracking preset correction for the regular mode has been completed. During the long-time mode, the switch 57 is connected to the contact Q. A control pulse shown in FIG. 6(A) which is reproduced by the video heads 15a and 15b for long-time mode, is passed through the amplifier 78, the switch 69, and the sampling pulse generating circuit 70, and converted into a sampling pulse shown in FIG. 6(B). This sampling pulse is supplied to the S/H circuit 71. On the other hand, a pulse shown in FIG. 6(C) which is obtained from the count down circuit 80, is used as a reference signal for both the head servo system and the capstan servo system. This pulse from the count down circuit 80 is applied to the monostable multivibrator 55, through the monostable multivibrator 54. A pulse shown in FIG. 6(D) is obtained from the monostable multivibrator 55 by the pulse width adjustment performed therein, and applied to the monostable multivibrator 56. Positional adjustment is made, and a pulse shown in FIG. 6(E) is produced from the monostable multivibrator 56. The output pulse of the monostable multivibrator 56 is supplied to the monostable multivibrator 59, through the switch 57. A pulse shown in FIG. 6(F) is thus obtained from the monostable multivibrator 59 and applied to the monostable multivibrator 72, to trigger this monostable multivibrator 72 with the falling edge of the pulse shown in FIG. 6(F). Accordingly, the monostable multivibrator 72 produces a pulse shown in FIG. 6(G). This pulse shown in FIG. 6(G) is converted into a pulse shown in FIG. 6(H) at the monostable multivibrator 73 provided at the succeeding stage. Furthermore, the pulse from the monostable multivibrator 73 is converted into a trapezoidal wave of a 2-field period as shown in FIG. 6(I), at the trapezoidal wave generating circuit 74. This trapezoidal wave is supplied to the S/H circuit 71 wherein substantially the center portion of the sloping portion of the trapezoidal wave is sampled and held by the sampling pulse shown in FIG. 6(B). The output voltage of the S/H circuit 71 is applied to the capstan motor 21, through the motor driving amplifier 75. Therefore, the magnetic tape is caused to travel at a speed which is ⅓ the tape traveling speed upon regular mode, for example.

On the other hand, the pulse shown in FIG. 6(C) which is obtained from the count down circuit 80, is supplied to the S/H circuit 63 through the monostable multivibrators 64 and 65. The S/H circuit 63 samples and holds the sloping portion of the trapezoidal wave obtained from the trapezoidal wave generating circuit 62. A voltage obtained by holding the above sampled voltage is applied to the head motor 19, through the motor driving amplifier 66. A pulse having a repetition frequency in accordance with the rotational speed of the head motor 19, is obtained from the pickup head 60 and applied to the flip-flop 61. The frequency of the pulse applied to the flip-flop 61 is frequency-divided into ½ the original frequency, that is, to 30 Hz, and converted into a square wave. This square wave from the flip-flop 61 is applied to the trapezoidal wave generating circuit 62. Therefore, the head motor 19 is rotated at a constant speed, and the video heads 15a and 15b are rotated at a constant speed, by the head servo system.

When reproducing the standard tape of the long-time mode, the time constants of the monostable multivibrators 55 and 56 are variably controlled, so that the level of the reproduced frequency-modulated video signal becomes maximum. By this adjustment, even if the mechanical position of the control head 32 remains the same, the reproduced control pulse in the long-time mode becomes the same as the control pulse reproduced by a control head 32 which is at a position where the regular distance L for the long-time mode is obtained. The tracking preset correction operation is accordingly completed. Hence, in the apparatus according to the present invention, it is unnecessary to record and reproduce a frequency-modulated video signal in the long-time mode and perform adjustments so that the level of the reproduced frequency-modulated video signal becomes maximum, although such adjustments were required in the conventional apparatus.

Describing this in more detail, in the conventional recording and reproducing apparatus, during the long-time reproducing mode, time constants of first and second monostable multivibrators connected in series in two stages for delaying the reproduced control pulse from the amplifier 78 is variably controlled, instead of varying the time constants of the monostable multivibrators 55 and 56, and this reproduced control pulse is supplied to the sampling pulse generating circuit 70. In addition, the control pulse upon recording is recorded after delaying the control pulse at the monostable multivibrators. Accordingly, if the position of the control head 32 upon long-time mode is such that the actual distance L is deviated from the predetermined distance L, and the time deviation in the reproduced control pulse due to this deviation is ΔT (msec), the total delay quantity of the above first and second monostable multivibrators was adjusted to ΔT, and the sum of the total delay quantity of the monostable multivibrators 55 and 56 upon recording and the above total delay quantity upon recording was set equal to the period (33.3 msec, for example) of the control pulse.

For this reason, in the conventional apparatus, after performing the above first and second adjusting steps in the long-time mode, it was necessary to perform third and fourth adjusting steps. In the third adjusting step, the standard tape in the long-time mode was reproduced in the long-time mode, and the time constants (delay times) of the above first and second monostable multivibrators were variably adjusted so that the level of the reproduced frequency-modulated video signal became maximum. Then, in the succeeding fourth adjusting step, a frequency-modulated video signal was recorded onto the magnetic tape 20 in the long-time mode and this magnetic tape was reproduced in the long-time mode, and further, the time constants of the above first and second monostable multivibrators were variably adjusted so that the level of the reproduced frequency-modulated video signal became maximum. As as result of performing the above third adjusting step, the control pulse reproduced when the level of the reproduced frequency-modulated video signal is maximum, becomes equivalent to the control pulse reproduced by a control head which is at a position such that the predetermined distance L is obtained. However, the control pulse recording phase upon long-time mode is not necessarily equal to the regular recording mode. Thus, the fourth adjusting step was performed so that even the control pulse recorded in the long-time mode, becomes equivalent to the control pulse recorded by a control head at the regular position.

Even if the mechanical mounting position of the control head 32 is deviated with respect to the above predetermined distance L, the position of the control head can be corrected electrically, by obtaining a delay quantity over one period of the control pulse. The two monostable multivibrators, that is, the above first and second monostable multivibrators become necessary to obtain the delay quantity over one period of the control pulse. This is because the frequency of the control pulse will be frequency-divided into ½ the original frequency if the control pulse is delayed by a delay time over one period at a single monostable multivibrator.

As opposed to the above described conventional apparatus, in the apparatus according to the present invention, the control pulse to be recorded is delayed at the monostable multivibrators 55 and 56 only during the long-time mode. On the other hand, the reproduced control pulse is not delayed during the long-time mode. Moreover, the reference signal in the capstan servo system is delayed by a delay quantity obtained by adding the delay quantity of the monostable multivibrator 59 to the delay quantities of the monostable multivibrators 55 and 56. Here, the delay quantity of the monostable multivibrator 59 is adjusted by the above described first adjusting step so that the level of the reproduced frequency-modulated video signal in the regular mode becomes maximum. Hence, when the magnetic tape recorded in the long-time mode is reproduced in the long-time mode by the same recording and reproducing apparatus, the phase of the reproduced control pulse with respect to the output drum pulse of the flip-flop 61 always becomes the same as that upon recording, regardless of the delay quantities of the monostable multivibrators 55 and 56.

Thus, when recording and reproduction is performed in the long-time mode, the level of the reproduced frequency-modulated video signal always becomes maximum, regardless of the delay quantities of the monostable multivibrators 55 and 56. Hence, in the recording and reproducing apparatus according to the present invention, the tracking preset correction is completed by performing the third adjusting step in which the total delay quantity of the monostable multivibrators 55 and 56 is varied when the standard tape of the long-time mode is reproduced so that the level of the reproduced frequency-modulated video signal becomes maximum.

Therefore, in the apparatus according to the present invention, it is unnecessary to perform the fourth adjusting step which was required in the conventional apparatus.

The tracking preset correction is performed to electrically and mechanically adjust the position of the control pulse, so that the phase of the reproduced control pulse at the output of the control head 32 with respect to the drum pulse upon reproduction becomes the same as that upon recording. That is, the tracking preset correction is performed by maintaining the phase difference between the output drum pulse of the flip-flop 61 and the reproduced control pulse from the control head 32 to a constant value. In order to carry out such tracking preset correction, the following three other methods may be considered besides delaying the output of the count down circuit 80 as in the present embodiment. One method is to delay the output drum pulse of the flip-flop 61 only during reproduction, and to supply the delayed drum pulse to the trapezoidal wave generating circuit 62. A second method is to delay the output signal of the count down circuit 80 only during reproduction, and to supply the delayed signal to the monostable multivibrator 65. Furthermore, a third method is the method used in the conventional apparatus described above employing the first and second monostable multivibrators. However, in the present invention, the same monostable multivibrator which delays the vertical synchronizing signal (or a signal in synchronism with the vertical synchronizing signal such as a drum pulse, for example) during the long-time recording mode to record the delayed vertical synchronizing signal as the control pulse, is also used upon reproduction with the same delay quantity. This condition is only satisfied by the above first method, because the relationship between the phases of the drum pulse and the control pulse must be such that the phase of the control pulse lags the phase of the drum pulse as the delay quantity becomes large. However, in the above first method, the drum pulse is delayed, and this delay causes phase lag in the head servo system. Hence, this first method is undesirable in that the operation of the head servo system becomes unstable. On the other hand, even if the output signal of the count down circuit 80 is delayed by the monostable multivibrators 55 and 56 as in the present embodiment, this delay will not cause instability in the capstan servo system, since these monostable multivibrators 55 and 56 are provided in the reference signal system. Therefore, the present embodiment shows a most suitable tracking preset correction circuit.

Actual numerical examples of the above predetermined distance L are given in the following table. In the table, it is assumed that the recording and reproducing time in the long-time mode is three times as long as the recording and reproducing time in the normal mode.

TABLE

|  | Regular Mode | Long-time Mode |
| --- | --- | --- |
| Tape Speed | 33.35 mm/sec | 11.12 mm/sec |
| Track Pitch | 58 μm | 19.3 μm |
| Distance L | 79.244 mm | 79.253 mm |

The present invention can also be applied to a recording and reproducing apparatus having two kinds of long-time modes. For example, a first long-time mode may have a recording and reproducing time which is three times that of the regular mode with respect to the same length of magnetic tape, and a second long-time mode may have a recording and reproducing time which is twice that of the regular mode with respect to the same length of magnetic tape. When selecting either one of the long-time modes, switches 81 and 82 shown in FIG. 5 are switched over to change the time constants of the monostable multivibrators 55 and 56.

In the above description, the mechanically fixed or mounted position of the control head 32 was assumed to be the predetermined position in the regular mode. However, the mechanically fixed position of the control head 32 may be the predetermined position in the long-time mode, and the correction may be performed electrically in a similar manner. Moreover, the control head 32 may be fixed at a position not corresponding to the predetermined position in any mode, to perform the correction electrically in all the modes. However, in this case, the switch 57 shown in FIG. 5 is not required, and the time constants of the monostable multivibrators 55 and 56 are changed according to the recording and reproducing mode. In addition, in this case, the standard tape of the regular mode is reproduced, for example, in the above described second adjusting step, and it is necessary to vary the time constants of the monostable multivibrators 55 and 56 so that the level of the reproduced frequency-modulated video signal becomes maximum. In this case, the first and third adjusting steps may be performed similarly as in the above described embodiment. Thus, the tracking preset correction can be carried out by performing the three adjusting steps.

In the circuit shown in FIG. 5, the input signal to the monostable multivibrator 55 passes through a pulse delay circuit comprising the monostable multivibrators 55 and 56. whose delay quantity varying range is over one period of the input signal to the monostable multivibrator 55, and is supplied to the monostable multivibrators 58 and 59, without varying the repetition frequency of the input signal to the monostable multivibrator 55. This measure is taken because, if the input signal is delayed at a single monostable multivibrator by a delay quantity over one period of the input signal, the repetition frequency of the output signal of the single monostable multivibrator becomes ½ the original repetition frequency of the input signal.

However, in the pulse delay circuit comprising the monostable multivibrators connected in series in two stages, the delay quantity of each monostable multivibrator is adjusted separately, so that the total delay quantity becomes equal to the predetermined value. Hence, the delay quantity must be varied and adjusted twice, and there was a disadvantage in that the adjusting operation was troublesome to perform. In addition, because a volume adjusting knob is required in each monostable multivibrator for varying the delay quantity (time constant), the cost of the parts becomes high compared to the case where only one monostable multivibrator is used. Furthermore, the value of the volume for varying the above delay quantity generally deviates from the standard to an extent of 20% at the maximum. Thus, due to this deviation from the standard, the delay quantity in one monostable multivibrator may become larger than one period of the input signal such as the reproduced control pulse, to cause erroneous operation.

Figure 7:
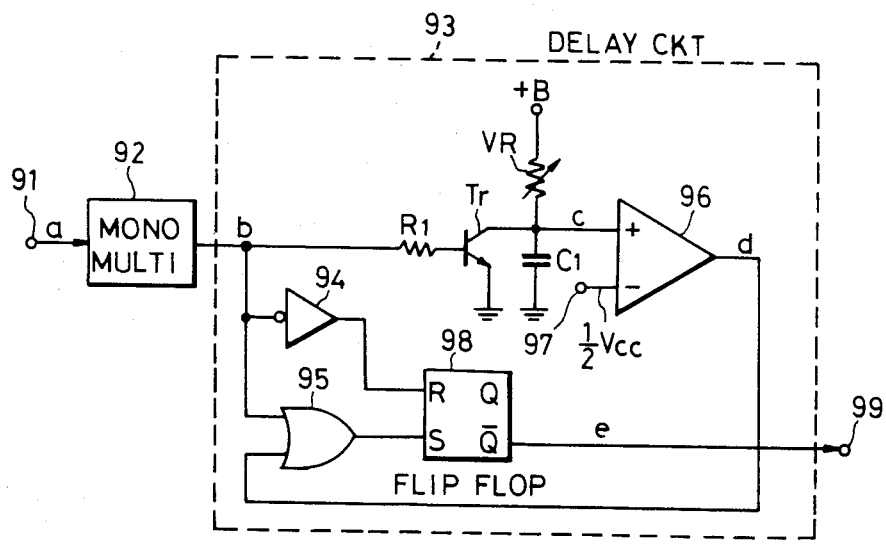
FIG. 7 is a system circuit diagram showing an embodiment of an essential part of the block system shown in FIG. 5.
Figure 8:
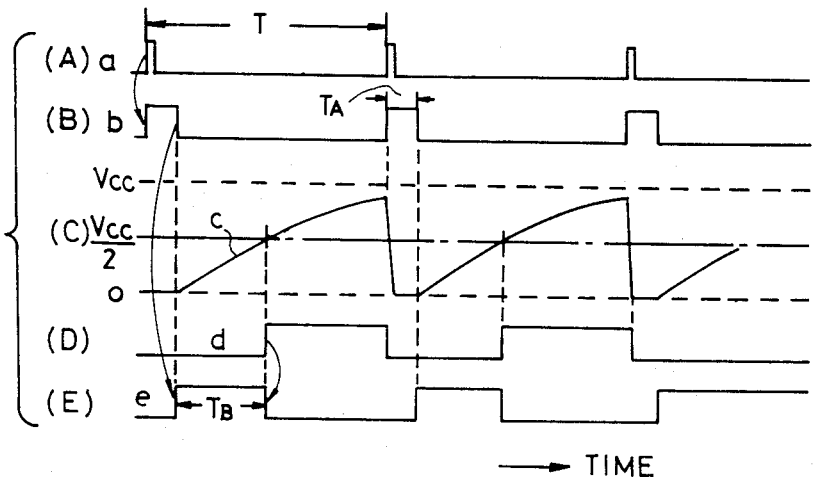
FIGS. 8(A) through 8(E) are graphs respectively showing signal waveforms at each part of the circuit system shown in FIG. 7.

Accordingly, in the present embodiment, the monostable multivibrator in the second stage is constructed as shown in FIG. 7. In FIG. 7, an incoming pulse to an input terminal 91 is applied to a monostable multivibrator 92, to trigger the monostable multivibrator 92 with the rising edge of the incoming pulse. For example, this monostable multivibrator 92 corresponds to the monostable multivibrator 55 shown in FIG. 5. The delay quantity of the monostable multivibrator 92 is selected to a minimum time sufficient to discharge a capacitor C1 within a delay circuit 93 provided at a succeeding stage. Thus, if the input pulse from the input terminal 91 has a waveform a shown in FIG. 8(A), for example, a pulse b having a constant pulse width TA shown in FIG. 8(B) is obtained at the output of the monostable multivibrator 92. The polarity of this pulse b having the pulse width TA, is inverted by an inverter 94 within the delay circuit 93, and applied to a reset terminal of a flip-flop 98. On the other hand, the pulse b is supplied to a set terminal of the flip-flop 98, through a 2-input OR circuit 95. The flip-flop 98 is reset by a rising edge of an input pulse to the reset terminal thereof, and set by a rising edge of an input pulse to the set terminal thereof. Accordingly, the flip-flop 98 is reset by the output pulse of the inverter 94, after a time TA elapses from the rising edge of the input pulse a.

The output pulse b of the monostable multivibrator 92 is also applied to the base of an NPN type transistor Tr through a resistor R1, to control the switching of the transistor Tr. Here, the collector of the transistor Tr is connected to a connection point of a non-inverting input terminal of a comparator 96, a variable resistor VR, and the capacitor C1. The other terminal of the variable resistor VR is connected to a DC power source voltage terminal +B, and the other terminal of the capacitor C1 is grounded. Furthermore, a constant DC voltage Vcc/2 is applied to an inverting input terminal of the comparator 96, from an input terminal 97. An output terminal of the comparator 96 is connected to the other input terminal of the OR circuit 95.

Hence, the transistor Tr is turned OFF during the low-level period of the pulse b. During this period in which the transistor Tr is turned OFF, the capacitor C1 is gradually charged with a charging time constant determined by values of the variable resistor VR and the capacitor C1, by the power source voltage +B which is applied to this capacitor C1 through the variable resistor VR. This charging time constant is selected to a value such that the terminal voltage of the capacitor C1 becomes Vcc/2 within approximately ½ the period T of the input pulse a, for example. In addition, the transistor Tr is turned ON during the high-level period of the pulse a, that is, for a time TA from the rising edge of the pulse a. However, during this period in which the transistor Tr is turned ON, the charged electrical charge in the capacitor C1 is instantaneously discharged through the transistor Tr. Accordingly, the terminal voltage of the capacitor C1 becomes as indicated by c in FIG. 8(C). This terminal voltage c of the capacitor C1 is applied to the non-inverting input terminal of the comparator 96 wherein the level of the terminal voltage c is compared with the DC voltage Vcc/2. Therefore, a pulse d shown in FIG. 8(D) is obtained from the comparator 96. This pulse d is applied to the set terminal of the flip-flop 98 through the OR circuit 95, to set the flip-flop 98 by the rising edge of the pulse d.

During normal operation of the flip-flop 98 when the inconsistencies in the variable resistor VR does not become a problem, the flip-flop 98 is put into a reset state for a period TB from a point in time TA after the rising edge of the input pulse a to a point in time when the output pulse d of the comparator 96 rises. On the other hand, the flip-flop 98 is put into a set state from the point in time when the pulse d rises to a point in time TA after the succeeding rising edge of the input pulse a. Accordingly, a pulse e shown in FIG. 8(E) is produced from a $\overline{Q}$-output terminal of the flip-flop 98, and supplied to an output terminal 99. This output pulse e has the same repetition frequency as the input pulse a, as clearly seen from FIGS. 8(A) and 8(E). Moreover, this pulse e is given a delay quantity (TA+TB). The delay quantity TB can be adjusted to an arbitrary value within a varying range between zero and (T−TA) by merely varying the single variable resistor VR. Therefore, the total delay quantity (TA+TB) can be adjusted to an arbitrary value within a varying range between TA and T by merely varying the variable resistor VR. The value of TA is an exceedingly small value as described above.

Figure 9:
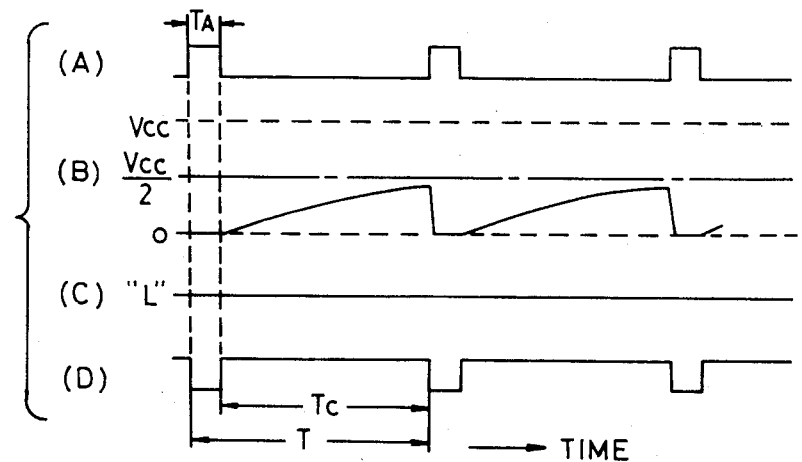
FIGS. 9(A) through 9(D) are graphs respectively showing signal waveforms at each part of the circuit system shown in FIG. 7 when irregularity in a variable resistor becomes large.

The above described case is when the inconsistencies in the variable resistor VR does not become a problem. However, the value of the variable resistor VR may deviate to an extent of 20% at the maximum due to temperature variations and the like, and in such a case, the delay quantity TB becomes larger than the value (T−TA). But according to the present embodiment of the invention, during the period in which the output pulse of the monostable multivibrator 92 (identical to the pulse shown in FIG. 8(B)) maintains the transistor Tr in the OFF state, the terminal voltage of the capacitor C1 does not become larger than the DC voltage Vcc/2 as shown in FIG. 9(B). Accordingly, the output voltage of the comparator 96 remains at low level as shown in FIG. 9(C), and does not assume a high level. Thus, the flip-flop 98 is reset after the time TA elapses from the rising edge of the input pulse a as in the normal case described above in conjunction with FIGS. 8(A) through 8(E). However, the timing with which the flip-flop 98 is set, is different from the above normal case. That is, the flip-flop 98 is set at the rising edge of the output pulse of the monostable multivibrator 92.

Therefore, in this case, a pulse shown in FIG. 9(D) is produced through the output terminal 99. This output pulse has the same repetition frequency as the input pulse a, and is given a delay quantity (TA+TC) which is equal to the input pulse period T from the rising edge of the input pulse a. That is, according to the present embodiment, because the delay quantity is limited to TC ($\approx$T) regardless of the inconsistencies in the value of the variable resistor VR, erroneous operations are prevented from occurring in latter stages of the circuit.

Further, the present invention is not limited to these embodiments, but various variations and modifications may be made without departing from the scope of the present invention.

What is claimed is:

1. A video signal recording and reproducing apparatus for recording and reproducing a video signal on and from a magnetic tape, by selecting an arbitrary recording and reproducing time mode from among a plurality of recording time modes and a plurality of reproducing time modes in which tape traveling speed and track pitch differ and recording and reproducing time for the same length of magnetic tape differ, and selecting a plurality of pairs of video heads, said video signal recording and reproducing apparatus comprising:
   recording and reproducing means for recording a frequency-modulated video signal on tracks formed obliquely with respect to the longitudinal direction of the magnetic tape and reproducing the recorded frequency-modulated video signal from said tracks by a selected pair of said video heads;

a capstan for driving said magnetic tape in travel at a desired tape traveling speed among a plurality of tape traveling speeds, said desired tape traveling speed being in accordance with the selected recording and reproducing time mode;

a head servo circuit supplied with a vertical synchronizing signal within the video signal or a signal in phase synchronism with the vertical synchronizing signal as a reference signal upon recording, and supplied with a reference signal from a reference signal generating circuit upon reproduction, for rotating said plurality of pairs of video heads at a constant speed;

a first delay circuit for delaying a signal used as the reference signal for said head servo circuit;

a control head for recording an output signal of said first delay circuit as a control pulse onto a control track on said magnetic tape;

a second delay circuit for delaying an input signal or an output signal of said first delay circuit; and a capstan speed control circuit for controlling said capstan to rotate at a rotational speed so that said magnetic tape travels at said desired tape traveling speed which is in accordance with the selected recording time mode upon recording, and supplied with a reproduced control pulse from said control head and the output signal of said second delay circuit upon reproduction, for controlling said capstan to rotate at a rotational speed so that said magnetic tape travels at said desired tape traveling speed which is in accordance with the selected reproducing time mode upon reproduction responsive to a compared output which is obtained by comparing phases of the signals supplied to said capstan speed control circuit upon reproduction.

2. A video signal recording and reproducing apparatus as claimed in claim 1 which further comprises a switch for selectively producing the input signal and the output signal of said first delay circuit in accordance with the selected recording and reproducing time mode, said switch supplying the input signal of said first delay circuit to said second delay circuit during a regular reproducing time mode, and supplying the output signal of said first delay circuit to said second delay circuit during a long-time reproducing time mode in which reproduction is performed for a longer time period than said regular reproducing time mode with respect to the same length of the magnetic tape.

3. A video signal recording and reproducing apparatus as claimed in claim 2 in which a delay quantity of said first delay circuit is selected to be a delay quantity so that the level of a reproduced frequency-modulated video signal becomes maximum upon reproduction of a standard tape for the long-time recording and reproducing time mode, said standard tape for long-time recording and reproducing time mode being recorded with the frequency-modulated video signal in an ideal state where said control head is positioned at a predetermined position.

4. A video signal recording and reproducing apparatus as claimed in claim 2 in which a delay quantity of said second delay circuit is selected to be a delay quantity so that the level of a reproduced frequency-modulated video signal becomes maximum upon reproduction of a magnetic tape recorded with the frequency-modulated video signal in a regular recording time mode during said regular reproducing time mode.

5. A video signal recording and reproducing apparatus as claimed in claim 1 in which said first delay circuit comprises switching means for switching a delay quantity according to the different recording and reproducing time modes.

6. A video signal recording and reproducing apparatus as claimed in claim 1 in which said first delay circuit comprises two monostable multivibrators connected in series in two stages, said monostable multivibrators respectively having a delay quantity shorter than one period of said control pulse, and a varying range of the delay quantity of said first delay circuit is longer than one period of said control pulse.

7. A video signal recording and reproducing apparatus as claimed in claim 1 in which said first delay circuit comprises a third delay circuit for delaying the input pulse for an exceedingly short period of time, a charging and discharging circuit supplied with an output delayed pulse of said third delay circuit and controlled of the charging and discharging by said delayed output pulse, for varying a charging and discharging time constant, a comparator for comparing levels of an output voltage of said charging and discharging circuit and a reference voltage, an OR circuit for obtaining a logical sum of an output signal of said comparator and said input pulse or a pulse in phase synchronism with said input pulse, and a flip-flop put in a first stable state by an output signal of said OR circuit and put in a second stable state by the output delayed pulse of said third delay circuit, for producing a delayed pulse.

* * * * *